US011301873B2

(12) United States Patent
Kinoshita et al.

(10) Patent No.: US 11,301,873 B2
(45) Date of Patent: Apr. 12, 2022

(54) INFORMATION PROCESSING SYSTEM, INFORMATION PROCESSING METHOD, AND INFORMATION PROCESSING PROGRAM

(71) Applicant: NEC CORPORATION, Tokyo (JP)

(72) Inventors: Yutaka Kinoshita, Tokyo (JP); Shunsuke Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 16/469,970

(22) PCT Filed: Nov. 9, 2017

(86) PCT No.: PCT/JP2017/040434
§ 371 (c)(1),
(2) Date: Jun. 14, 2019

(87) PCT Pub. No.: WO2018/110164
PCT Pub. Date: Jun. 21, 2018

(65) Prior Publication Data
US 2019/0347671 A1  Nov. 14, 2019

(30) Foreign Application Priority Data
Dec. 15, 2016 (JP) .............................. JP2016-243724

(51) Int. Cl.
*G06Q 30/02* (2012.01)
*G06F 16/335* (2019.01)
*G06K 9/00* (2006.01)

(52) U.S. Cl.
CPC ........... *G06Q 30/02* (2013.01); *G06F 16/337* (2019.01); *G06K 9/00771* (2013.01)

(58) Field of Classification Search
None
See application file for complete search history.

(56) References Cited

U.S. PATENT DOCUMENTS 9,726,509 B1\* 8/2017 Thai .................... G01C 21/3461
2012/0033123 A1\* 2/2012 Inoue ....................... G08G 1/04
348/333.13
2015/0125042 A1\* 5/2015 Haden ................ G06K 9/00771
382/105

FOREIGN PATENT DOCUMENTS

| JP | 11-296539 A | 10/1999 |
| JP | 2014-203272 A | 10/2014 |
| JP | 2016-45949 A | 4/2016 |
| JP | 2016-173692 A | 9/2016 |

OTHER PUBLICATIONS

International Search Report for PCT/JP2017/040434 dated Dec. 26, 2017 [PCT/ISA/210].

\* cited by examiner

*Primary Examiner* — David Perlman
(74) *Attorney, Agent, or Firm* — Sughrue Mion, PLLC

(57) ABSTRACT

There is disclosed an information processing system for effectively using information indicating the state of a store visitor at the time of a visit. The system includes a recognizer that recognizes a store visitor and a transporter at the time of a visit by analyzing video information captured by an outside-the-store camera provided outside a store. The system also includes a determiner that determines a moving range of each store visitor recognized by the recognizer. Furthermore, the system includes a deriving unit that derives a trading area of the store based on a determination result of the determiner.

10 Claims, 6 Drawing Sheets

FIG. 5

| STORE VISIT TIME | STORE VISIT MEANS | AGE | SEX | RELATIONSHIP | STORE VISIT DIRECTION | MOVING DISTANCE |
|---|---|---|---|---|---|---|
| 2016:10:31:10:01:35 | MERCEDES-BENZ GLS 2016 | 60'S | MALE | FAMILY | EAST | 3000m |
| 10:05:23 | PINARELLO 2016 PRIMA503 | 40'S | FEMALE | NONE | WEST | 1000m |
| 10:15:38 | WALKING | 20'S | MALE | LABRADOR RETRIEVER | SOUTH | 500m |
| ... | ... | ... | ... | ... | ... | ... |

361

INFORMATION PROCESSING SYSTEM, INFORMATION PROCESSING METHOD, AND INFORMATION PROCESSING PROGRAM

CROSS REFERENCE TO RELATED APPLICATIONS

This application is a National Stage of International Application No. PCT/JP2017/040434, filed on Nov. 9, 2017, which is based upon and claims the benefit of priority from Japanese patent application No. 2016-243724, filed on Dec. 15, 2016, the disclosure of which is incorporated herein in its entirety by reference.

TECHNICAL FIELD

The present invention relates to an information processing system, an information processing method, and an information processing program.

BACKGROUND ART

In the above technical field, patent literature 1 discloses a technique of performing, with a camera, image capturing/video analysis of a license plate of a vehicle entering a parking lot, specifying a customer, and providing an image in accordance with the customer.

CITATION LIST

Patent Literature

Patent literature 1: Japanese Patent Laid-Open No. 2016-045949

SUMMARY OF THE INVENTION

Technical Problem

In the technique described in the above literature, however, only a license plate is captured to specify a store visitor, and it is impossible to effectively use the state of the store visitor at the time of a visit.

The present invention enables to provide a technique of solving the above-described problem.

Solution to Problem

One example aspect of the present invention provides an information processing system comprising:
a recognizer that recognizes a store visitor and a transporter at the time of a visit by analyzing video information acquired by capturing an outside of a store;
a determiner that determines a moving range of the store visitor recognized by the recognizer; and
a deriving unit that derives a trading area of the store based on a determination result of the determiner.

Another example aspect of the present invention provides an information processing method comprising:
recognizing a transporter of a store visitor at the time of a visit by analyzing video information acquired by capturing an outside of a store;
determining a moving range of each store visitor recognized in the recognizing; and
deriving a trading area of the store based on a determination result in the determining.

Still other example aspect of the present invention provides an information processing program for causing a computer to execute a method, comprising:
recognizing a store visitor and a transporter at the time of a visit by analyzing video information acquired by capturing an outside of a store;
determining a moving range of each store visitor recognized in the recognizing; and
deriving a trading area of the store based on a determination result in the determining.

Advantageous Effects of Invention

According to the present invention, it is possible to effectively use information indicating the state of a store visitor at the time of a visit.

BRIEF DESCRIPTION OF DRAWINGS

FIG. 5 is a table showing an example of a database of the information processing system according to the second example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
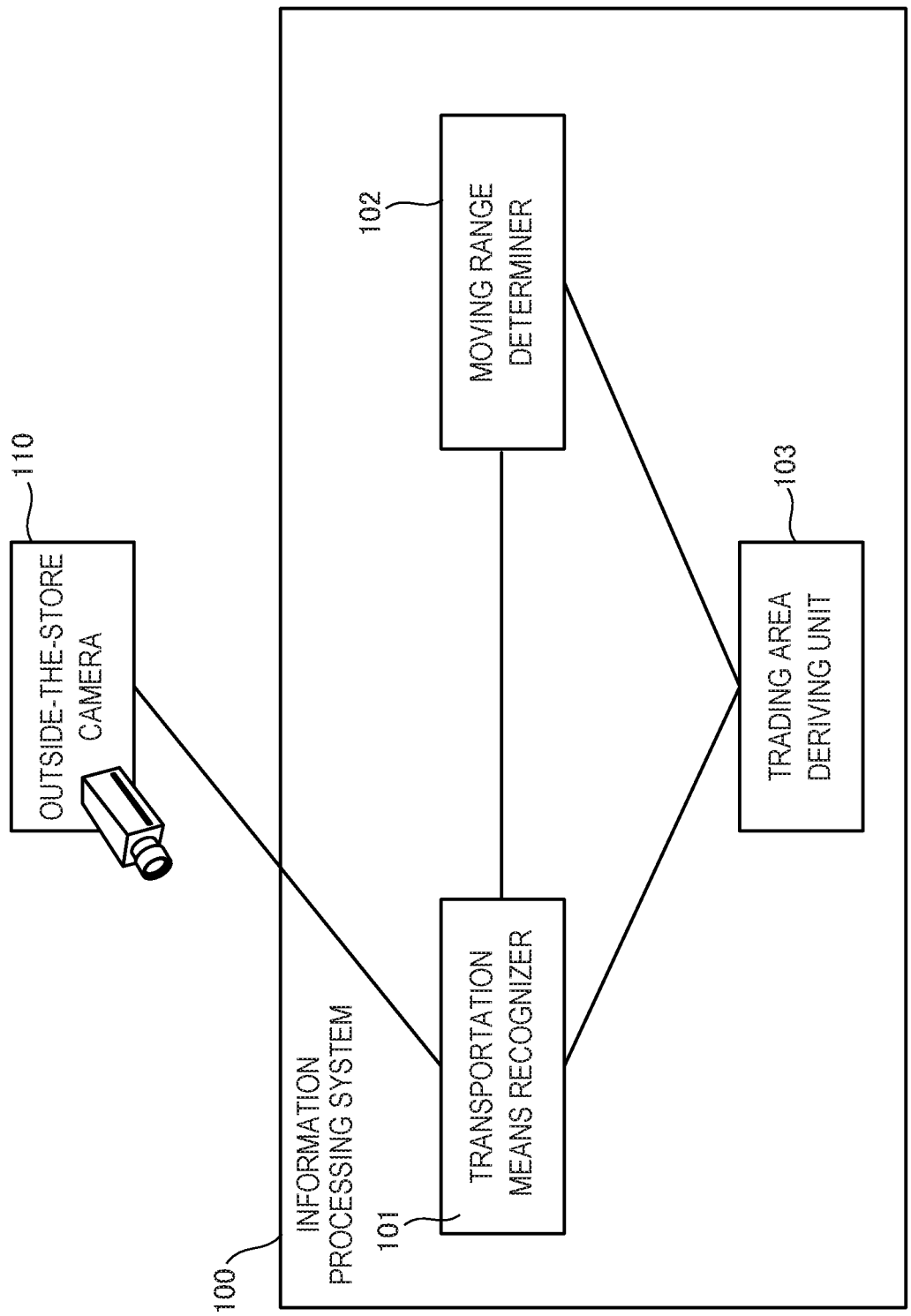
FIG. 1 is a block diagram showing the arrangement of an information processing system according to the first example embodiment of the present invention.

An information processing system 100 according to the first example embodiment of the present invention will be described with reference to FIG. 1. As shown in FIG. 1, the information processing system 100 includes a transporter recognizer 101, a moving range determiner 102, and a trading area deriving unit 103.

The transporter recognizer 101 recognizes the transporter of a store visitor at the time of a visit by analyzing video information captured by an outside-the-store camera 110 provided outside a store.

The moving range determiner 102 determines the moving range of each transporter recognized by the transporter recognizer 101.

The trading area deriving unit 103 derives the trading area of the store based on a determination result of the moving range determiner 102.

With the above arrangement, it is possible to derive the trading area of each store using a video of the outside-the-store camera provided for the store, and use it for marketing such as a store opening plan. Note that the outside-the-store camera is not limited to a camera installed outside the store, and any camera capable of capturing the outside of the store can be used.

Second Example Embodiment

Figure 2:
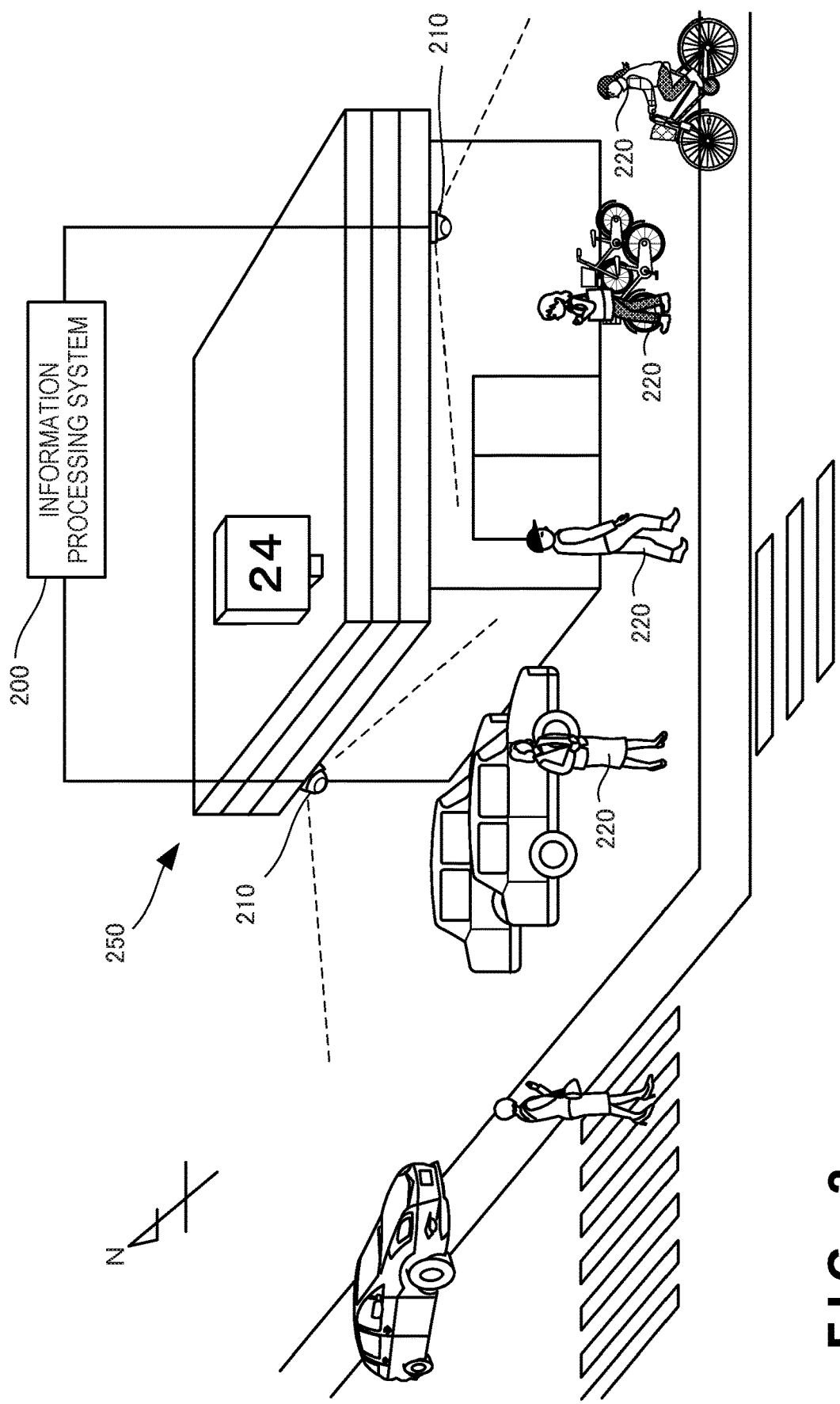
FIG. 2 is a view showing the use state of an information processing system according to the second example embodiment of the present invention.

An information processing system according to the second example embodiment of the present invention will be described next with reference FIGS. 2 to 6. FIG. 2 is a view for explaining an overview of an information processing system 200 according to this example embodiment.

As shown in FIG. 2, the information processing system 200 is a system that analyzes a video of each store visitor 220 captured by each outside-the-store camera 210, and derives the trading area of a store 250. It is possible to efficiently and effectively operate the store based on the derived trading area. FIG. 2 exemplifies the two outside-the-store cameras. However, the number of outside-the-store cameras is not limited to this. The store is not limited to a retail store, and the present invention is applicable to all types of business establishments such as dining and/or drinking establishments and amusement facilities.

Figure 3:
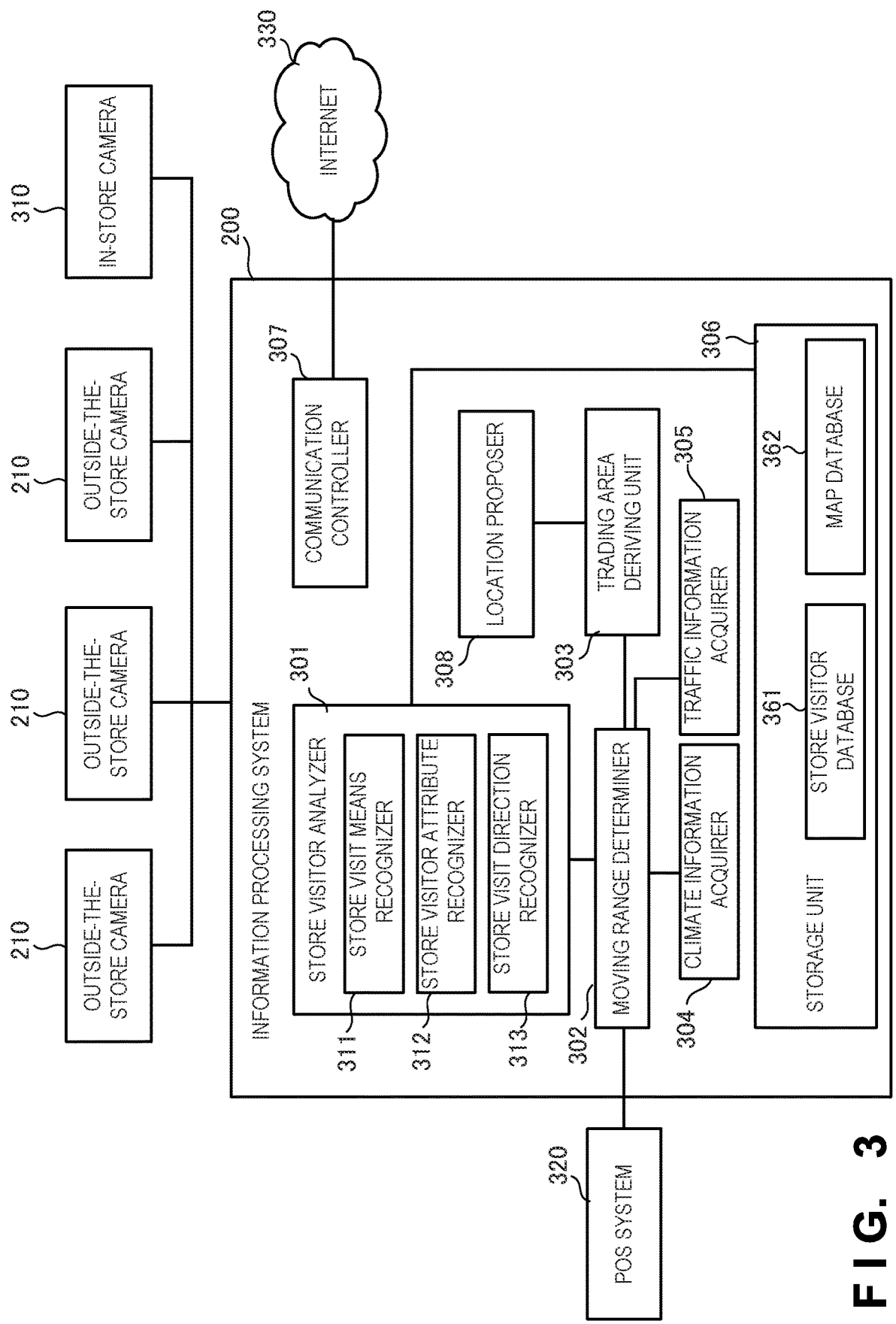
FIG. 3 is a block diagram showing the arrangement of the information processing system according to the second example embodiment of the present invention.

FIG. 3 is a block diagram for explaining the functional arrangement of the information processing system 200. The information processing system 200 includes a store visitor analyzer 301, a moving range determiner 302, a trading area deriving unit 303, a climate information acquirer 304, a traffic information acquirer 305, and a storage unit 306. The store visitor analyzer 301 includes a store visit means recognizer 311, a store visitor attribute recognizer 312, and a store visit direction recognizer 313. The storage unit 306 includes a store visitor database 361 and a map database 362.

The store visit means recognizer 311 receives video information captured by each outside-the-store camera 210 provided outside the store, analyzes the information, and recognizes one of walking, a bicycle, a car, a motorcycle (motorbike), a taxi, a fixed-route bus, and a train, which is used as a transporter by each store visitor 220 at the time of a visit.

The store visitor attribute recognizer 312 analyzes the video information captured by each outside-the-store camera 210 provided outside the store, and recognizes the ages, sexes, and relationship of the store visitors 220 (parent and child, a couple, a group of friends, or the like).

The store visit direction recognizer 313 recognizes a direction in which the store visitor 220 visits the store. The information processing system 200 can discriminate, based on the store visit directions and store visit dates/times, that the same person makes a stop at the store on the way to and from a station or a school.

As an example, if a store visitor purchases a breakfast on the way every day, and purchases another product on the way back, it is possible to grasp the going and returning movements (for example, on the way to and from a school) of the store visitor based on visit dates/times and the visit directions. As another example, if a specific person purchases a breakfast every day only on the way (that is, the person visits the store and purchases a breakfast on the way), it is possible to grasp that he/she does not make a stop at the store on the way back or he/she makes a stop at the store but purchases nothing. In this case, the information processing system 200 may grasp the above-described situation based on, for example, a purchase history of the specific person in addition to the visit dates/times and the visit directions.

If the store visitor analyzer 301 detects the visit dates/times and visit directions of an unspecified crowd, it may be determined that a festival or event is held in a surrounding region.

As an example, the store visitor analyzer 301 may detect the traffic of the unspecified crowd in addition to the visit dates/times and visit directions of the crowd. The information processing system 200 may present these pieces of information to, for example, the operator or manager of the store. That is, the information processing system 200 may present information usable for an assortment and sales promotion to the operator or manager of the store. As a result, the operator or manager of the store can determine the assortment in the store using the presented information.

More specifically, for example, if it is presented that the person does not make a stop at the store on the way back or the person makes a stop at the store but purchases nothing, the operator or manager can recognize that the purchase needs of the specific person are not satisfied or identified.

Therefore, for the purpose of encouraging the specific person to make a stop at the store on the way back and purchase a desired product, the operator or manager can study the merchandise assortment and sales promotion (issuance of vouchers usable at the time of a visit) based on, for example, the store visit direction, the store visit date/time, and the purchase history.

Alternatively, for example, if the traffic of the crowd is presented, the operator or manager can study the assortment and sales promotion in consideration of the traffic. The reason for this is that the operator or manager can predict that the return traffic is the same. As a result, the operator or manager can not only prepare a stock without stockout when the crowd visits the store but also prepare products required when the crowd returns home.

These pieces of information are not limited to the above-described examples. For example, the ratio of people who visit the store and purchase products with respect to the going traffic is obtained using the traffic, store visit dates/times, store visit directions, and purchase histories of the crowd, and can be used to estimate, based on the returning traffic predicted from the going traffic, the potential volume of products to be actually purchased.

The information recognized by the store visitor analyzer 301 is stored as the store visitor database 361 in the storage unit 306 together with store visit time.

The climate information acquirer 304 acquires climate information at the time of a visit. The traffic information acquirer 305 acquires traffic information (indicating whether a traffic jam occurs or not) at the time of a visit.

The moving range determiner 302 determines a moving range (moving distance) of each store visitor based on the store visit means recognized by the store visit means recognizer 311, the store visitor attributes (age, sex, and relationship) recognized by the store visitor attribute recognizer 312, and the store visit direction recognized by the store visit direction recognizer 313. The moving range determiner 302 also corrects the moving range (moving distance) of each store visitor using additional information such as time, weather, temperature, and traffic information.

Figure 4:
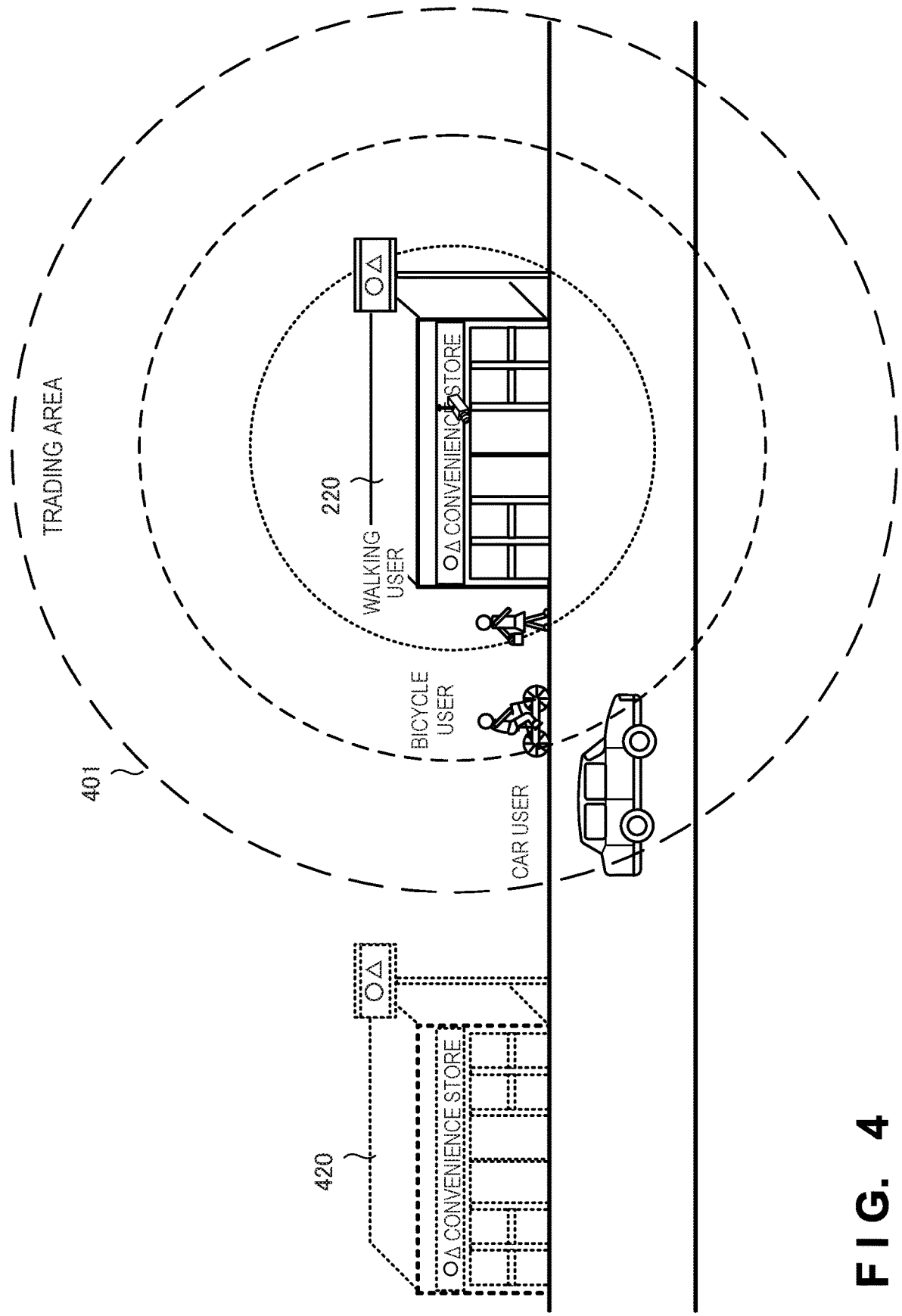
FIG. 4 is a view showing an example of a trading area derived by the information processing system according to the second example embodiment of the present invention.

Considering simply, as shown in FIG. 4, the moving distance can be determined to satisfy "walking<bicycle<car". For example, the moving range determiner 302 determines an average radius of about 100 m as the moving range of a store visitor who walks, a radius of about 500 m as the moving range of a store visitor who uses a bicycle, and a radius of about 2 km as the moving range of a store visitor who uses a car. The moving range determiner 302 may determine a different moving range for each sex. For example, for a store visitor who walks, the moving range determiner 302 may determine 150 m for a male and 100 m for a female.

If a store visitor who looks to be 60 years old or more, a coefficient of 1 or less (for example, 0.8) is integrated with the moving range. This is because the overall activity range of an old store visitor is considered to be narrow.

Similarly, for a store visitor with his/her family or for a visit in the night time, the moving distance of the car is multiplied by 0.5. This is because even if the distance is short, the store visitor highly probably moves by car for the case of taking his/her family or the case of the night time.

If it rains or the temperature is 5° C. or lower, the moving distance of the car is multiplied by 0.5. Alternatively, if it rains heavily, it snows, or the temperature is 5° C. or lower, the moving range determiner 302 may exclude the information about the transporter of the store visitor from the factors for deriving the trading area. If it is determined that a road around the store is congested, the moving distance may be determined by extending the moving range to a radius of about 2 km even for a store visitor who uses a bicycle.

Furthermore, the moving range determiner 302 may adjust the moving range of the store visitor using the store visit direction of the store visitor recognized by the store visit direction recognizer 313 and map information stored in the map database 362.

The moving range of each store visitor determined by the moving range determiner 302 is saved in the store visitor database 361.

The trading area deriving unit 303 derives the trading area (a geographic range influenced by a commercial facility, for example, a range where the store can attract customers) of the store 250 using the moving ranges of the respective store visitors accumulated in the store visitor database 361 and the map information saved in the map database. It is possible to grasp the market scale such as the population and market size of the trading area and the regional characteristics such as consumer characteristics and competition. As shown in FIG. 4, it is possible to make a store opening plan of opening a new store 420 outside a trading area 401 derived from the store visitor information of the store 250.

A location proposer 308 proposes the location of the new store based on the trading area derived by the trading area deriving unit 303. For example, the location proposer 308 maps, on the map, the trading area derived by the trading area deriving unit 303, and proposes, as the location of the new store, a region which is not included in the trading area.

The information processing system 200 is connected to a POS (Point Of Sales) system 320 that manages an in-store camera 310 and sales in the store. The information processing system 200 can determine the moving range of each store visitor from the store visitor database 361 using the features of the store visitor included in a video of the in-store camera 310, and provide a service in accordance with the determined moving range via the POS system 320. For example, the POS system 320 performs processing of displaying an advertisement (including a discount ticket) of another type of store (restaurant, car wash, or car dealer) existing in a region from which the store visitor is considered to visit the store, or printing the advertisement on a receipt and giving it to the store visitor.

The information processing system 200 can be connected to the Internet 330 via a communication controller 307, and the climate information acquirer 304 and the traffic information acquirer 305 can acquire climate information and traffic information from the Internet 330, respectively.

FIG. 5 shows the store visitor data stored in the store visitor database 361. For each store visitor, the store visit means, age, sex, relationship, store visit direction, and moving distance are recorded in addition to the store visit time and store leaving time.

As for the store visit means, a transporter such as a car, bicycle, or motorbike is registered as much detailed information as possible. For the car, a vehicle type and model year are specified based on the vehicle shape and emblem with reference to various vehicle databases, and then registered.

The age and sex derived from a face image of each store visitor are further registered in the store visitor database 361.

In addition, if at least two store visitors visit the store in a group, the relationship of the group is stored in the store visitor database 361. This is registered by estimating, based on the presence/absence of a person accompanying a child and the like, whether the group is a family. An accompanying person database may be additionally prepared, and may store data such as the face and age of an accompanying person. As for a store visitor with a dog, he/she is considered to make a stop during a walk, and thus the moving distance may be corrected to be longer. Note that the store visit means is stored for each store visitor in this example, but the store visit means may be managed for each group (each family or the like).

Figure 6:
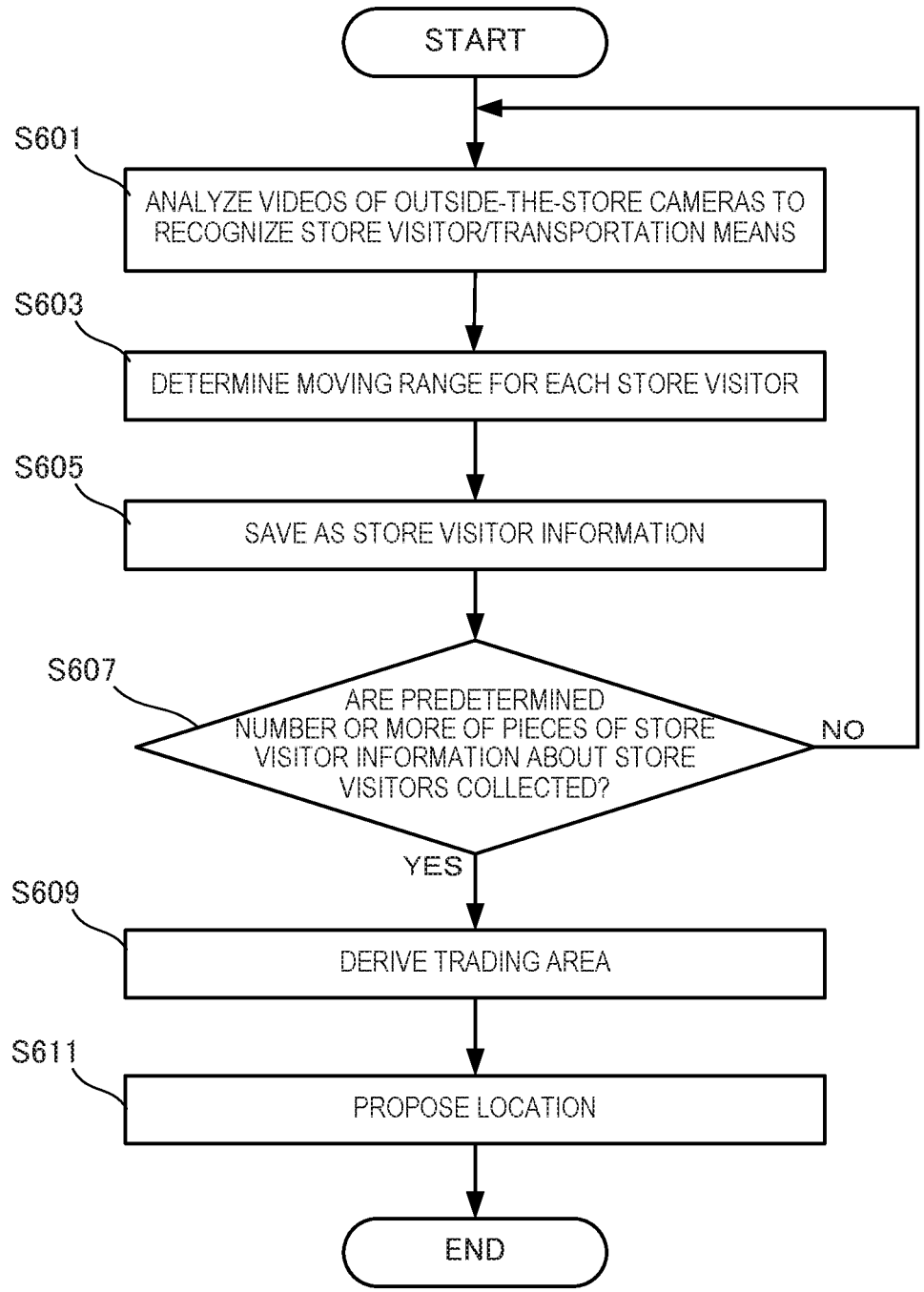
FIG. 6 is a flowchart illustrating the procedure of processing in the information processing system according to the second example embodiment of the present invention.

FIG. 6 is a flowchart illustrating the procedure of processing of deriving a trading area in the information processing system 200.

In step S601, videos of the outside-the-store cameras are analyzed to recognize each store visitor, a transporter, and the like. In step S603, a moving range (distance and direction) is determined for each store visitor. In step S605, the moving range for each store visitor is saved as store visitor information in the store visitor database 361.

If, in step S607, a predetermined number or more of pieces of store visitor information about store visitors can be collected, the process advances to step S609 to perform trading area deriving processing. For example, as the trading area deriving processing, the maximum value, minimum value, average value, or the like of the moving ranges for each store visit direction is obtained, and mapped on the map. The largest moving range may be selected, or an average value may be calculated by dividing the total sum of the moving distances of the store visitors by the number of store visitors. In step S611, after deriving the trading area, the location of a new store is proposed based on the trading area.

As described above, according to this example embodiment, it is possible to correctly derive a trading area for each store using videos of the outside-the-store cameras provided for the store, and use the trading area for marketing such as a store opening plan.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing system comprising:
   at least one memory that stores instructions; and
   at least one processor that executes the instructions to:
      recognize a store visitor and a transporter at a time of a visit by analyzing video information acquired by capturing an outside of a store;
      determine a moving range of the recognized store visitor on a basis of the recognized transporter;
      generate factors for deriving a trading area by correcting the moving range in accordance with at least one of weather at the time of the visit, a road condition at the time of the visit, an age of the store visitor, and a sex of the store visitor; and
      derive the trading area of the store based on the factors.

2. The information processing system according to claim 1, wherein the processor is further configured to execute the instructions to:
   propose a store opening position of a new store based on the trading area of the derived store and map information including the store.

3. The information processing system according to claim 1, wherein the processor is further configured to execute the instructions to recognize a store visit direction of the store visitor.

4. The information processing system according to claim 1, wherein the processor is further configured to execute the instructions to decide the moving range in accordance with a time period at the time of the visit.

5. The information processing system according to claim 2, wherein the processor is further configured to execute the instructions to recognize a store visit direction of the store visitor.

6. The information processing system according to claim 2, wherein the processor is further configured to execute the instructions to decide the moving range in accordance with a time period at the time of the visit.

7. The information processing system according to claim 3, wherein the processor is further configured to execute the instructions to decide the moving range in accordance with a time period at the time of the visit.

8. The information processing system according to claim 1, wherein the processor is further configured to execute the instructions to provide service information in accordance with the determined moving range.

9. An information processing method comprising:
   recognizing a transporter of a store visitor at a time of a visit by analyzing video information acquired by capturing an outside of a store;
   determining a moving range of the recognized store visitor on a basis of the recognized transporter;
   generating factors for deriving a trading area by correcting the moving range in accordance with at least one of weather at the time of the visit, a road condition at the time of the visit, an age of the store visitor, and a sex of the store visitor; and
   deriving the trading area of the store based on the factors.

10. A non-transitory computer readable medium storing an information processing program for causing a computer to execute a method, comprising:
    recognizing a store visitor and a transporter at a time of a visit by analyzing video information acquired by capturing an outside of a store;
    determining a moving range of the recognized store visitor on a basis of the recognized transporter;
    generating factors for deriving a trading area by correcting the moving range in accordance with at least one of weather at the time of the visit, a road condition at the time of the visit, an age of the store visitor, and a sex of the store visitor; and
    deriving the trading area of the store based on the factors.

* * * * *